May 12, 1953 R. S. TOWSE 2,638,317
VEHICLE MOVER
Filed July 18, 1949
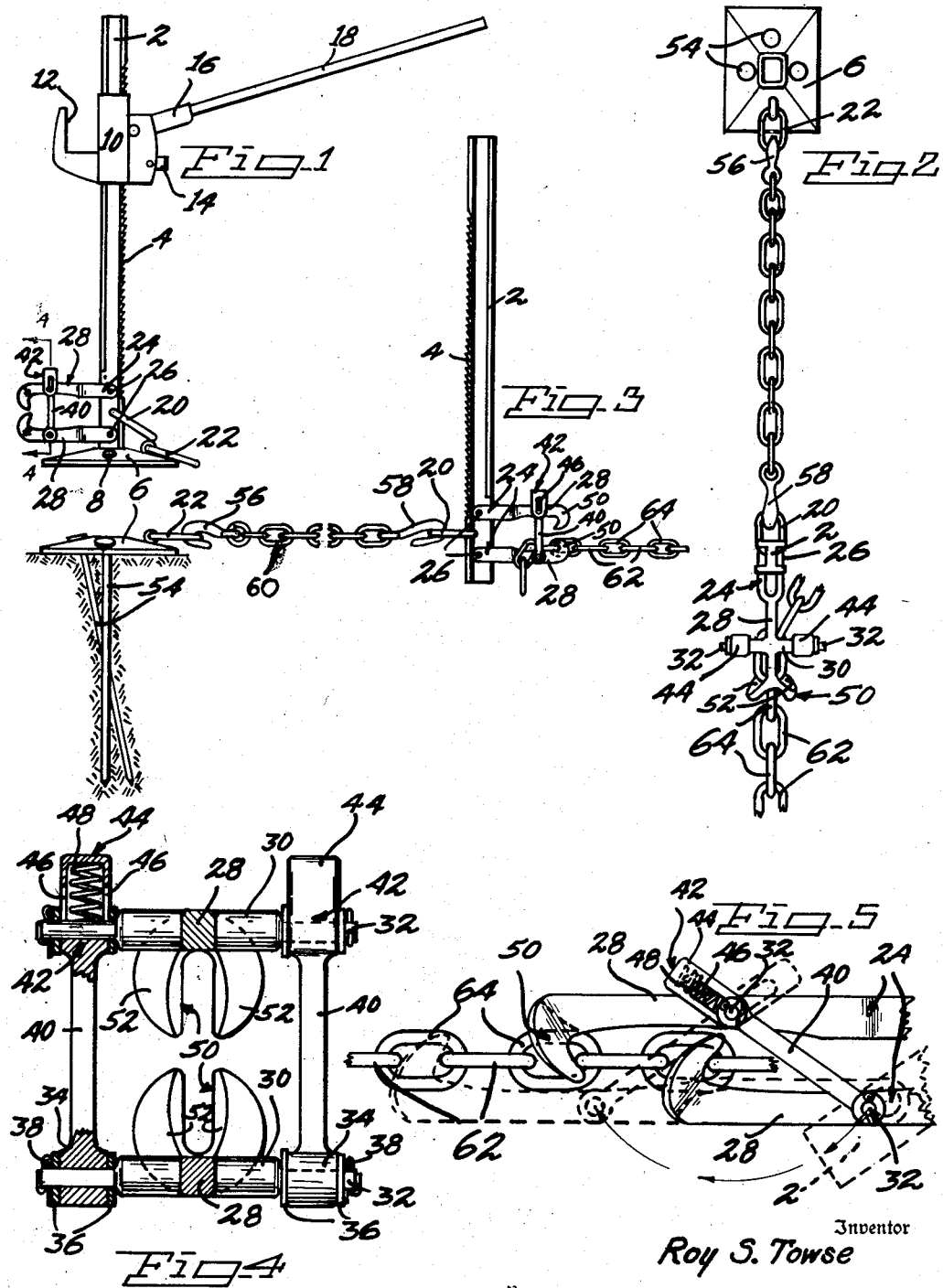
Inventor
Roy S. Towse
By Glenn L. Fish
Attorney Patented May 12, 1953

2,638,317

UNITED STATES PATENT OFFICE 2,638,317

VEHICLE MOVER

Roy S. Towse, Weiser, Idaho, assignor to Utility Tool Company, Inc., Weiser, Idaho Application July 18, 1949, Serial No. 105,387

3 Claims. (Cl. 254—105)

My present invention relates to an improved vehicle mover of the type adapted for use in moving vehicles such as cars or trucks from positions which such vehicles are unable to be extricated.

Frequently a car will become bogged down in mud or sand and if it could be moved a few feet to firmer ground it could then proceed under its own power. According to my invention I employ the conventional bumper jack for an automobile as a lever which with the added mechanism is employed to progressively move a chain secured to the vehicle so that with the position of the lever fixed, the vehicle will be moved.

The device of my invention has other uses which will be readily apparent, one example of which is its use in drawing vessels to the dock, or moving vessels up a ramp to a dry dock position.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of a conventionally designed auto bumper jack, the vertical post of which has the creeper hooks added thereto.

Fig. 2 is a top plan view of the mover ready for use.

Fig. 3 is a side elevational view thereof.

Fig. 4 is a transverse vertical sectional view through the creeper hooks.

Fig. 5 is an enlarged detail view of the creeper hooks.

Referring now to the drawings wherein I have illustrated the present preferred embodiment of my invention, I use a jack post 2 having a series of ratchet teeth 4 on one side and the post is designed to be supported by the base 6 having apertures 8 in conventional use. A jack head 10 has a bumper engaging hook 12 and a control lever 14 controls the internal ratchet mechanism, not shown. A sleeve 16 receives the lever 18 by means of which the jack head is raised on the post.

According to my invention I attach a ring 20 on the post 2 and a ring 22 on the base 6. Pairs of bifurcated arms 24 are pivotally secured at 26 on the post 2 in vertical spaced relation. Extending forwardly from the arms are hook shanks 28 and the laterally extending integral pins 30 have reduced bearing ends 32. The lower bosses 34 are secured by washers 36 and cotter pins 38 and are integral with links 40 which have upper bosses 42 formed with housings 44 having slots 46 and the springs 48 in the housings tension the movement of the upper bearing ends in the slots.

Each arm 28 has a pair of hook extensions 50 inclined away from the arms and formed with spaced hooks 52.

The base 6 when used in this connection is secured to the ground by pins 54 through apertures 8 and the hooks 56 and 58 of the anchor chain 60 connect the rings 22 and 20 of the base and post. A load chain has a horizontal series of links 62 and a vertical series 64 and it will be apparent that with the chain 60 secured and the load chain passed between the hooks 52 and a link 62 engaged thereby, pivotal movement of the post 2 now employed as a lever will cause the upper and lower hooks to alternately and successively engage the links 62 to pull the load toward the anchor chain.

The device of my invention may be quickly and easily installed or set up for use, and will clearly exert a great pull on the vehicle to be moved by the application of a relatively small force to the lever 2.

Having thus fully described my invention what I claim as new and desire to secure by Letters Patent is:

1. In a combination jack and vehicle puller, a post constituting a lever and adapted to be used as a portion of a jack, a ground plate adapted to be detachably mounted at the lower end of said post and removable therefrom for use as an anchor, said plate being formed with openings, elongated spikes of dimensions adapting them to be passed through the openings and driven into the ground and removably secure the plate upon the ground, an eye projecting upwardly from said plate, a ring loosely mounted through said eye for vertical tilting movement, a ring disposed laterally of said post and loosely mounted through an opening in the lower portion of the post for vertical tilting movement, a chain having hooks at opposite ends engageable through the rings and thereby removably mounting the chain between the plate and the post, hooks pivoted to the lower portion of said post above and below the ring carried thereby and projecting from the post at the opposite side thereof from its ring, and a load chain having links engageable by the hooks in step by step pulling movements during rocking movements of the post.

2. In a combination jack and vehicle puller comprising a bar constituting a lever and adapted to be used as a post for a jack, a plate adapted to be detachably engaged with the lower end of said bar and constituting a base for the jack when applied to the bar and an anchor plate for the vehicle puller when removed from the bar, removable fasteners for removably securing the plate firmly upon the ground, a ring carried by said plate, a ring tiltably carried by the lower portion of said bar and projecting laterally therefrom, a chain having hooks at its opposite ends detachably engageable with the rings and constituting a removable connection between the anchor plate and the bar, a load chain and chain-engaging grapples carried by and extending from the lower portion of the bar at the opposite side thereof from its ring.

3. A puller for extracting a mired vehicle comprising a bar constituting a lever, an anchor plate formed with openings, elongated spikes of dimensions adapting them to be passed downwardly through the openings and driven into the ground and removably secure the plate flat upon the ground, a ring carried by said plate, a ring carried by the lower end portion of said bar and projecting laterally therefrom, a chain having hooks at opposite ends detachably engageable with the rings and constituting a removable connection between the plate and the bar, and members carried by the lower portion of said bar and projecting therefrom at the opposite side of the bar from its ring for pulling engagement with a load chain.

ROY S. TOWSE.

References Cited in the file of this patent

UNITED STATES PATENTS

| Number | Name | Date |
|---|---|---|
| 2,497,805 | Towse | Feb. 14, 1950 |